United States Patent [19]

Crabtree

[11] Patent Number: 4,566,078
[45] Date of Patent: Jan. 21, 1986

[54] CONCURRENT MULTI-LINGUAL USE IN DATA PROCESSING SYSTEMS

[75] Inventor: Robert P. Crabtree, Colleyville, Tex.

[73] Assignee: International Business Machines Corp., Armonk, N.Y.

[21] Appl. No.: 480,419

[22] Filed: Mar. 30, 1983

[51] Int. Cl.⁴ .......................... G06F 3/00; G06F 15/00
[52] U.S. Cl. ...................................... 364/900; 364/300
[58] Field of Search ... 364/200 MS File, 900 MS File, 364/300 MS File, 146, 419, 147; 371/51

[56] References Cited

U.S. PATENT DOCUMENTS

| | | | |
|---|---|---|---|
| 4,064,561 | 12/1977 | Jennings | 364/900 |
| 4,122,533 | 10/1978 | Kubinak | 364/900 |
| 4,124,843 | 11/1978 | Bramson et al. | 364/900 |
| 4,130,882 | 12/1978 | Swanstrom et al. | 364/900 |
| 4,193,119 | 3/1980 | Arase et al. | 364/900 |
| 4,319,336 | 3/1982 | Anderson et al. | 364/200 |
| 4,365,315 | 12/1982 | Jamnik | 364/900 |
| 4,484,304 | 11/1984 | Anderson et al. | 364/900 |

OTHER PUBLICATIONS

IBM Tech. Discl. Bull., vol. 18, No. 8, "Multiple Language Display for Terminals", by Kihawley et al., Jan. 1976, p. 2560.

Primary Examiner—James D. Thomas
Assistant Examiner—William G. Niessen
Attorney, Agent, or Firm—C. Lamont Whitham; Thomas F. Galvin

[57] ABSTRACT

An improvement to a method of providing a distributed, interactive data processing system with concurrent multi-lingual use by a plurality of users is disclosed. According to the basic method, a message model data collection (18) is established by storing message models via a message identifier primary key that is common for all usage and a secondary key that is the national language index. Then using a central message service, messages are composed from message models retrieved from the message model data collection using the primary and secondary keys in response to a call from an application program (10). The improvement provides message models of informational or error messages generated by application program components, these message models being stored in the message model data collection. In this way, it is possible to display data obtained from the data collection in place of the original data provided in the informational or error message of application programs such as COBOL and FORTRAN.

12 Claims, 6 Drawing Figures

FIG.1 APPLICATION USE, DIRECT COMPOSITION

FIG.2 APPLICATION CONTROL USE, DIRECT COMPOSITION

FIG.3 SUPERVISOR USE, DIRECT COMPOSITION

FIG. 4 APPLICATION USE, CENTRAL COMPOSITION

FIG. 5   APPLICATION CONTROL USE, CENTRAL COMPOSITION

FIG. 6  SUPERVISOR USE, CENTRAL COMPOSITION

CONCURRENT MULTI-LINGUAL USE IN DATA PROCESSING SYSTEMS

FIELD OF THE INVENTION

The present invention is directed to the field of data processing, and more particularly to data processing systems which allow concurrent multi-lingual use.

BACKGROUND OF THE INVENTION

The change from centralized, batch operation of data processing systems to distributed, interactive usage has resulted in more users being directly involved with these systems. When a data processing system is used in a country with multiple national languages or is accessed by user terminals located in different countries with different national languages, the system must accept commands and respond in the national language or languages of the users. In the past, support for national languages has been accomplished by placing all messages in a collection that can be replaced either completely such that all users of a given system will see messages in a selected national language, or on a user by user basis such that each user will see messages of one national language. The first approach fails to offer a solution for users in a country, such as Canada, where there are more than one national language. Both approaches handle output only, are typically limited to messages, and have the following problems:

1. Language-dependent text other than messages exist in most computers in the form of language dependent (a) command verbs entered as input, such as "Delete", which must be recognizable by a program without need for separate programs to handle each national language, (b) keywords entered as input in commands or as screen panel fields, such as "source", (c) online documentation, or (d) prompts and help information.

2. They do not allow appropriate responses from service functions in a connected computer that has no knowledge of the requestor's language preference. For example, a user may invoke service A on computer 1. Service A may request assistance from service B on computer 2, and service B may need to send messages to the user even though the usage is indirect.

3. They do not allow use of a new function that is supported in a language that could be understood by the user if the preferred language is not yet available.

Even where the national language problem is solved, the fact that computer users are becoming more heterogeneous as the usage of computers spreads raises other problems. For example, not only may the national language preference of users in a distributed data processing system differ, but the level of experience or knowledge of the users may vary widely. In many cases, different classes of users need to use the same computer services, and this requires messages to be customized for each class of user. For example, a programmer could understand the message, "Node XYZ does not respond, reinitialization will take 10 minutes." and could arrange other work until it became available. However, mail room data entry personel whose work depends on node XYZ might more easily understand, "Take a 10 minute coffee break and then try again." Some messages could, of course, be understood oy all classes of users. Therefore, not only are translations of all messages needed for users in different national languages, but some messages must be customized for different classes of users.

Many existing applications such as COBOL and FORTRAN were originally written only in English. This has not been a problem in the past where, for example, a German programmer has learned the meaning of the application's English commands. However, as the use of such products moves away from the data processing professional, the need for national language support in the application products increases. Unfortunately, it is often time consuming and costly to modify existing applications which have been written to support only one language in such a way that they would support more than one. A common architecture or design has not been found which might be applied to solve this problem since each application addresses its message and dialog generation in a different way. One alternative to address this problem involves producing different versions of the application, each one of which supports a single national language. This is not only expensive to develop, test, and maintain but requires the installation which has a need for more than one language to purchase multiple licenses.

SUMMARY OF THE INVENTION

It is therefore an object of the present invention to provide a data processing system which facilitates concurrent multi-lingual use.

It is another object of the invention to provide a data processing system capable of being used by many different people with widely varying experience and knowledge.

It is yet another object of the invention to provide a mechanism to facilitate the generation of messages by programmed components such that national language support can be added to these components without making any modifications to the component.

It is a further object of the invention to provide a way for a program to be independent of the national language in which an input to the computer is received.

Briefly stated, the objects of the invention are accomplished by using national language indexes together with specialized services to provide complete support in the national language preferred by the user. As used herein, "complete" means the user will not sense output (e.g. see, hear, or feel in the case of braille) in any other language unless it is one the user has specified as an acceptable alternative, and all input by the user (e.g. typed or spoken) is in the preferred national language. The national language indexes are selected either when the user is enrolled, or from the "Sign On" entry screen if users are not enrolled. More than one national language index is given per user, a primary index which identifies the language most preferred by a user, and one or more secondary indexes that identify languages that the user can understand even though they are not the preferred language. Use of these indexes allow all programs, including application, application control, and supervisor programs, to be independent of the user's chosen national language.

The national language indexes are used for a data collection that contains message models. Message models are stored via a message identifier primary key that is common for all usage and a secondary key that is the national language index. A central message service composes messages from message models by substituting language independent variable values before the message is shown to the user. More particularly, the message service receives requests for message text from application, application control and supervisor programs. The requesting program supplies the message identifier, and the message service uses that as the primary key for retrieval from one or more data collections containing message models. The message service uses as a secondary key the national language index which is set when the user signs on to the computer. The message model data collections may be organized in any manner that allows use of primary and secondary keys. All such collections have a secondary key to identify the national language of the message model. In addition to the language index that is set when the user signs on, other values are set to identify an order of search among data collections according to the classification of the current user. The message service searches different data collections until it finds the first occurrence of the requested message model in the national language needed for a particular user. This classification index could be used as a tertiary index within a single data collection in an alternative implementation. That message model is composed and sent to application control. A message coordinator program in application control checks the message identifier and the type of output device to determine what action is necessary.

Separate data collections for each language contain other types of text that are more specialized or of greater volume than messages. These data collections contain the national language index as a standard part of their identifying name. The collections are made available for each user so the order of search for named elements will find the material in the primary (preferred) or secondary (usable) national language. Examples of use include on-line documentation, HELP texts, static text on display panels, and sample data for application programs or application usage environments. The idiosyncrasies and differences between languages create problems that sometimes are best solved by language-dependent versions of programs. Such cases are likely to occur when the program must be adjusted because of differences in length or format for the same information in different languages. The advantages of such data collections being available for all programs are that all input required of a user and all text responses to the user can be in the national language of the user and, therefore, concurrent, multi-lingual use of the system is possible. For example, a French speaking user and an English speaking user can use the same programs on the same system concurrently without encountering any text in the other user's language.

The invention also allows a program to be independent of the national language in which the input to the computer is received. The national language index is used to obtain variable names and the text strings associated with each variable, in pairs. The program can obtain the variable-name/text-string pairs directly or a central service may be requested to store the text strings for retrieval via the variable name. The variable name has a particular meaning to the program and the associated text string is the language independent input that will trigger that meaning. That is, input from the user can be compared with text strings associated with relevant variables to find the meaning known to a language-dependent program. National language indexes are used to locate the appropriate file to define command-verb synonyms, a technique common to other operating systems. The technique of variable-name/text-string pairs for use with various types of input is similar to, but more general than command-verb synonym processing.

The invention further facilitates the generation of messages by programmed components that do not have interfaces for national language support such that national language support can be added to these components without making any modifications to the components and also allows new languages to be added without modifying the components. Most operating systems have specific interfaces for user messages, such as "Write to Operator" in OS/370, "Terminal PUT" in TSO, and "Write Terminal" in VM/370. Modification of those interfaces allow messages from old programs to be intercepted and replaced with messages in other national languages. The message identifier contained in the old message is used to retrieve a template that identifies substitutable values in the original message, and the replacement message model is retrieved by the national language index. The replacement service uses the message, the template and the message model to compose an equivalent message in the user's national language.

BRIEF DESCRIPTION OF THE DRAWINGS

The foregoing and other objects, aspects and advantages of the invention will be better understood from the following detailed description of a preferred embodiment with reference to the drawings, in which.

DESCRIPTION OF THE PREFERRED EMBODIMENT

As used in the description which follows, variables behave and can be used as if they were handled by an associative memory dedicated to a specific user's job. As used herein, "job" is synonymous with "session", "process" or "address space". That is, 1. Variable names and values are dynamically definable;

2. Values associated with a specific variable may be stored or fetched by name, i.e. the program that uses them does not know their storage location;

3. Storage and retrieval of variable values is managed by a Supervisor Service;

4. Variable values are accessible, i.e. may be fetched and stored, by any program that runs for a specific user ("any program" includes Application, Application Control or Supervisor programs, and "Supervisor" is synonymous with "Operating System");

5. Variable values can be arithmetic, i.e. binary, or character strings; and

6. Implicit conversion between arithmetic values and character strings will occur automatically according to usage context, and explicit conversion in either direction can be requested.

The Supervisor (or operating system) program characteristics relevent to the invention are as follows:

1. They contain components or services that run at the highest priority;

2. They provide generic services and interfaces through which these services may be requested oy either Application programs or Application Control programs;

3. They include Message Services of two types:

a. Message Request interface which receives requests from Supervisor programs or Application programs to send a specific message to a user. This interface forwards the request to Application Control programs by assigning values to variables and causing an event to be stacked for Application Control. This event allows an Application Control program to decide how to send the information to the user according to characteristics of the output device(s) used by the specific user, i.e. turn on a light, compose and display text, convert via voice synthesis, or provide a braille surface.

b. Message Composition interface which composes message text from message models (character strings) that include recognizable variable names. The variable names in the message model are replaced with the current values associated with those names. The message model to use in composition is determined by the following:

(1) A message context identifier which is the same regardless of national language;

(2) A primary (preferred) national language index stored in a variable when the user signed-on to the computer, or a secondary (acceptable) national language index defined and stored in a similar manner; and (3) A user class identifier used to customize the choices of messages within a given national language. For example, user class can be used to obtain message text customized according to the needs of a non-professional, a professional, a beginning user, an experienced user, and so forth.

The Application Control characteristics relevant to the invention are as follows:

1. They are programs that run at the same priority as the Supervisor, and higher than Application programs.

2. They have an event logic. Events can be triggered by any of the following:

a. any program that runs for a specific user;

b. hardware on the local computer; or c. network data traffic from other computers.

Events are stacked until corresponding Application Control programs are free to handle them.

3. They have an event processing program to handle events created by the Message Service programs in the Supervisor. The events relay requests from either Application, Application Control, or other Supervisor programs that act for the user. Application program characteristics relevant to the invention are as follows:

1. They are fetched and begin to run at the request of an Application Control program in a given user's job.

2. They run or execute only when Application Control and Supervisor programs have no current work to do for the specific user, i.e. at the lowest priority.

3. They can request services provided by Supervisor programs or Application Control programs.

4. Their requests may be via macros, subroutine or function calls.

5. Their requests may cause events for Application Control programs. Message services can be used in two modes by any type of program:

1. Central Composition which is designed so a single component may handle all general message traffic to the output device that interfaces with the user. This frees application programs from need to decide whether the text goes to a display, a voice synthesizer, a braille surface, or merely turns on an indicator light.

2. Direct Composition which leaves disposition of the message text to the program that requests its composition. This leaves the program free to use the text in several ways. Some examples follow:

a. as message that is sent to the user directly, or through other services;

b. as output to a data file, such as column headers in compiler listings, or records of system activity;

c. as a pre-fetched copy of a frequently used message to the user; or d. as a means to check national language dependent responses from the user, i.e. words and phrases.

Figure 1:
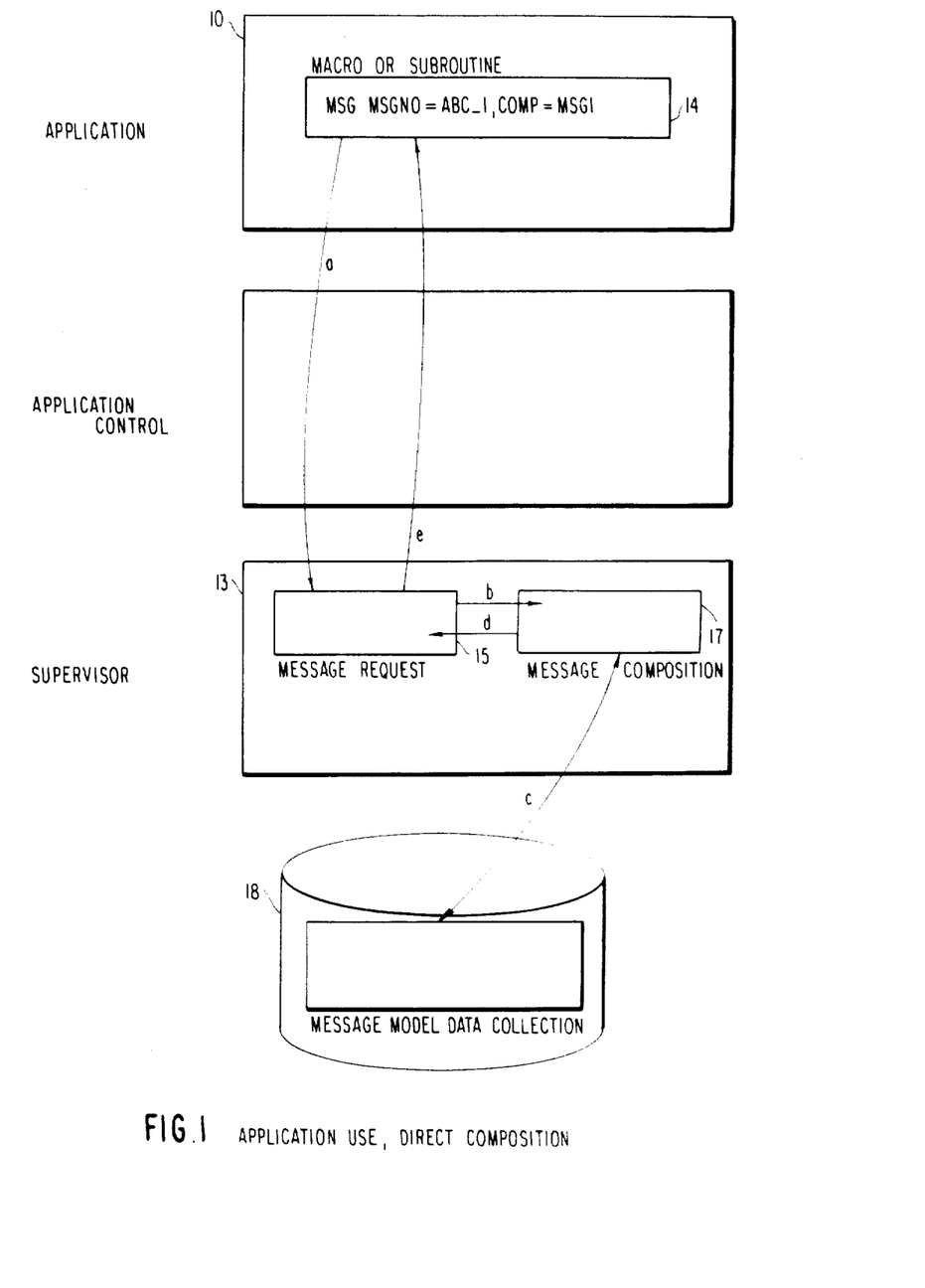
FIG. 1 is a block diagram illustrating the flow of message data with direct composition of the message and use by the application program.

Beginning now with reference to FIG. 1, the implementation of direct message composition will be described first because of the simpler flow of data. The Application program 10 uses a macro 14, or a subroutine that uses the macro, to request message composition service. The macro can also assign values to variables that will be substituted into the message model during composition, but the example here will omit that detail. For example, the macro

MSG MSGNO=ABC-1,COMP=MSG1 requests composition of message model ABC-1 into the variable MSG1. The macro causes control to pass, as indicated by the arrow a, to Message Request service 15 in the Supervisor 13. Because it is a direct composition request (COMP=MSG1), Message Request 15 calls Message Composition 17 as indicated by the arrow b. Message Composition in turn uses the Message Model identification (ABC-1) and the national language index established when the user signed onto the computer, e.g. 006 for Spanish, to obtain the correct message model from the Message Model Data Collection 18 as indicated by the arrow c. Any substitutable variable names in the message model are replaced by the current value of the variables, the resulting text is stored as the value of the variable MSG1, and control returns to Message Request 15 as indicated by the arrow d. Message Request now returns control to the Application 10 as indicated by arrow e, and the message text is ready for use by the Application.

Figure 2:
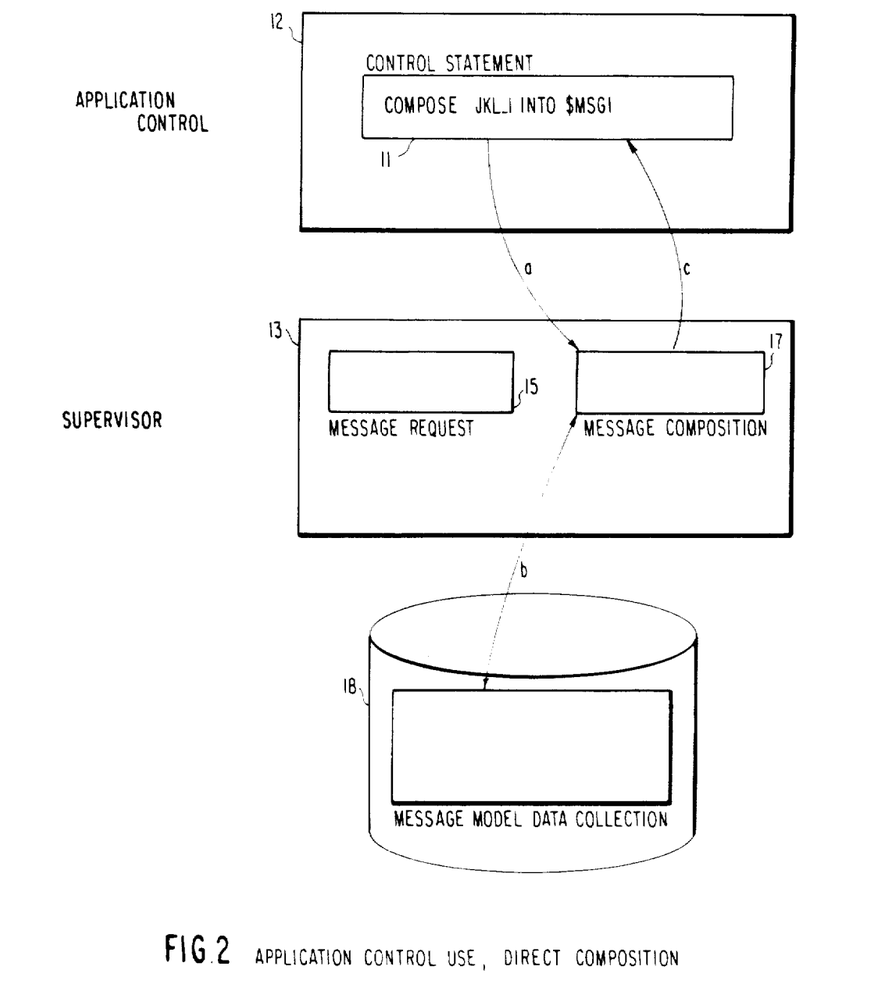
FIG. 2 is a block diagram illustrating the flow of message data with direct composition of the message and use by the application control program.

In FIG. 2, the Application Control program 12 uses a control statement 11 to request message composition service. Values must have been assigned to variables that will be substituted into the message model during composition, but again the example here will omit that detail. For example, the control statement

COMPOSE JKL-1 INTO $MSG1 requests composition of message model JKL-1 into the variable $MSG1. The statement causes control to pass, as indicated by arrow a, to Message Composition service 17 in the Supervisor 13. Message Composition 17 uses the Message Model identification (JKL-1) and the national language index established when the user signed onto the computer, e.g. 006 for Spanish, to obtain the correct message model from the Message Model Data Collection 18 as indicated by the arrow b. Any substitutable variable names in the message model are replaced by the current value of the variables, the resulting text is stored as the value of the variable $MSG1, control then returns to the Application Control 12 following the control statement 11 as indicated by arrow c, and the message text is ready for use by Application Control.

Figure 3:
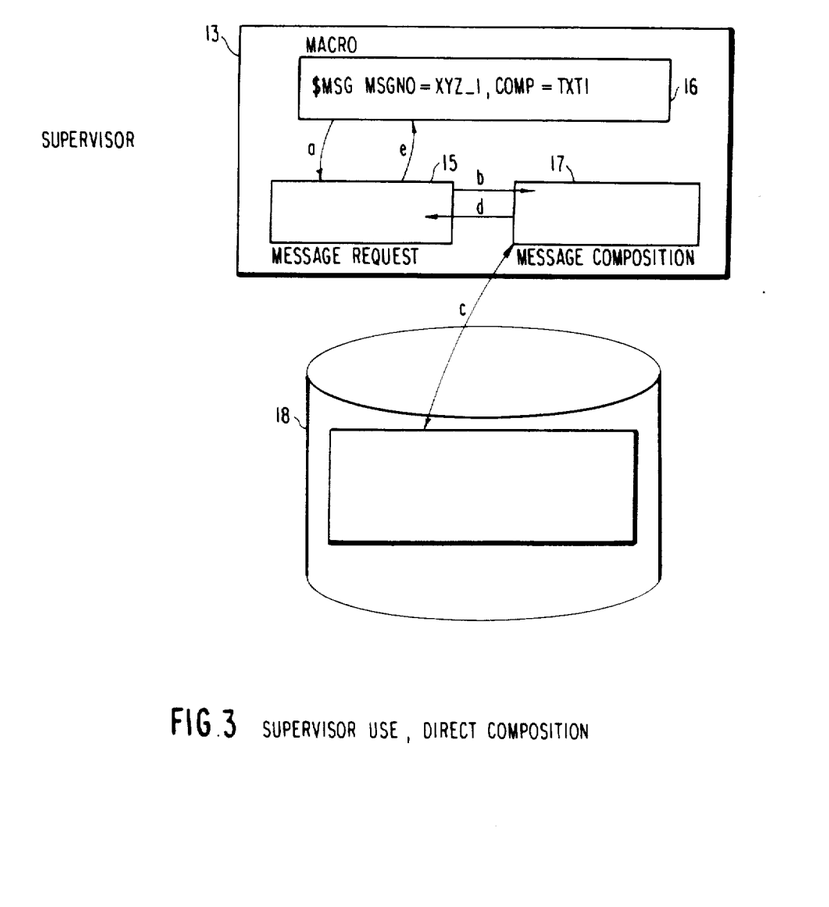
FIG. 3 is a block diagram illustrating the flow of message data with direct composition of the message and use by the supervisor program.

In FIG. 3, the Supervisor program 13 uses a macro 16 to request message composition service. The macro can also assign values to variables that will be substituted into the message model during composition, but as before the example here will omit that detail. For example, the macro $MSG MSGNO=XYZ-1,COMP=TXT1 requests composition of message model XYZ-1 into variable TXT1. The macro causes control to pass, as indicated by arrow a, to Message Request service 15 in the Supervisor 13. Because it is a direct composition request (COMP=TXT1), Message Request 15 calls Message Composition 17 as indicated by arrow b. Message Composition uses the Message Model identification (XYZ-1) and the national language index established when the user signed onto the computer, e.g. 006 of Spanish, to obtain the correct message model from the Message Model Data Collection 18 as indicated by arrow c. Any substitutable variable names in the message model are replaced by the current value of the variables, the resulting text is stored as the value of the variable $MSG1, and control returns to Message Request 15 as indicated by arrow d. Message Request then returns control to the Supervisor program following the macro 16 as indicated by the arrow e, and the message text is ready for use by the Supervisor.

Figure 4:
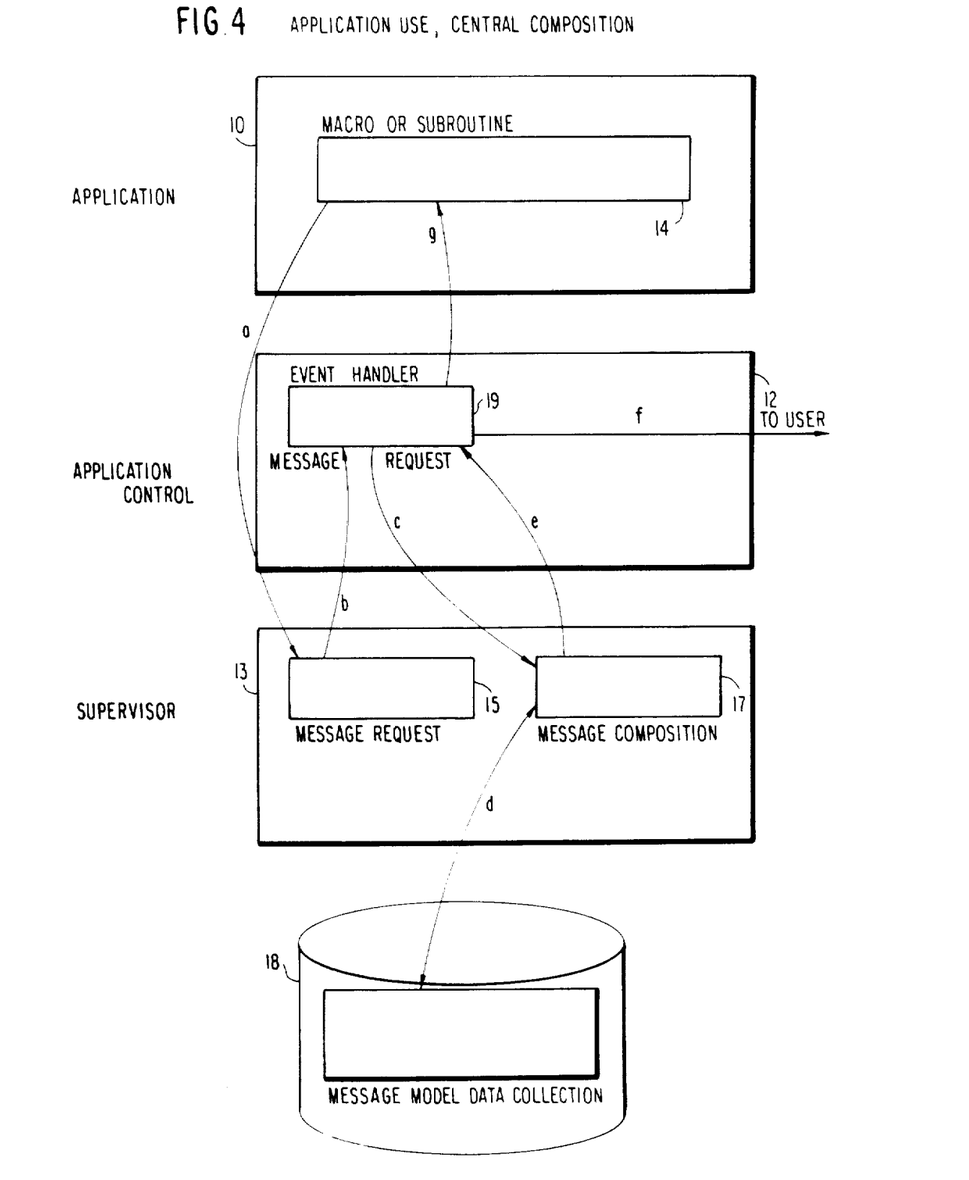
FIG. 4 is a block diagram illustrating the flow of message data with central composition of the message and use by the application program.

The examples described thus far illustrate implementation of the direct composition of messages. Next, beginning with reference to FIG. 4 will be described examples illustrating implementation of central composition of messages. In FIG. 4, the Application program 10 uses a macro 14, or a subroutine which uses the macro, to request message composition service. The macro can also assign values to variables that will be substituted into the message model during composition, but the example here will omit that detail. For example, the macro

MSG MSGNO=ABC-1 requests information from message model ABC-1 be given to the user. The macro causes control to pass, as indicated by arrow a, to Message Request service 15 in the Supervisor 13. Message Request stores the message model identification (ABC-1) in a variable and causes an event to be stacked for Message Request 19 in Application Control 12 as indicated by arrow b. Message Request 19 is an event handler that decides how the message is to be passed to the user and can base that decision on the message model identification. If the message model identification is one that means an indicator light should be turned on rather than passing textual information to the user, then that is done, and control passes back to the Application program 10 following macro 14 as indicated by arrow g. On the other hand, if message text must be passed to the user, then a control statement in Message Request 19 of Application Control 12 passes control to Message Composition 17 in the Supervisor 13 as indicated by the arrow c. Message Composition uses the Message Model identification (ABC-1) and the national language index established when the user signed onto the computer, e.g. 006 for Spanish, to obtain the correct message model from the Message Model Data Collection 18 as indicated by the arrow d. Any substitutable variable names in the message model are replaced by the current value of a variable, the resulting text is stored as the value of a variable, and control returns to Message Request 19 in Application Control 12 as indicated by arrow e. Message Request 19 sends the message text to the user as indicated by the arrow f. When all Application Control programs quiesce, then the lower priority Application program 10 resumes execution following the macro 14 as indicated by the arrow g.

Figure 5:
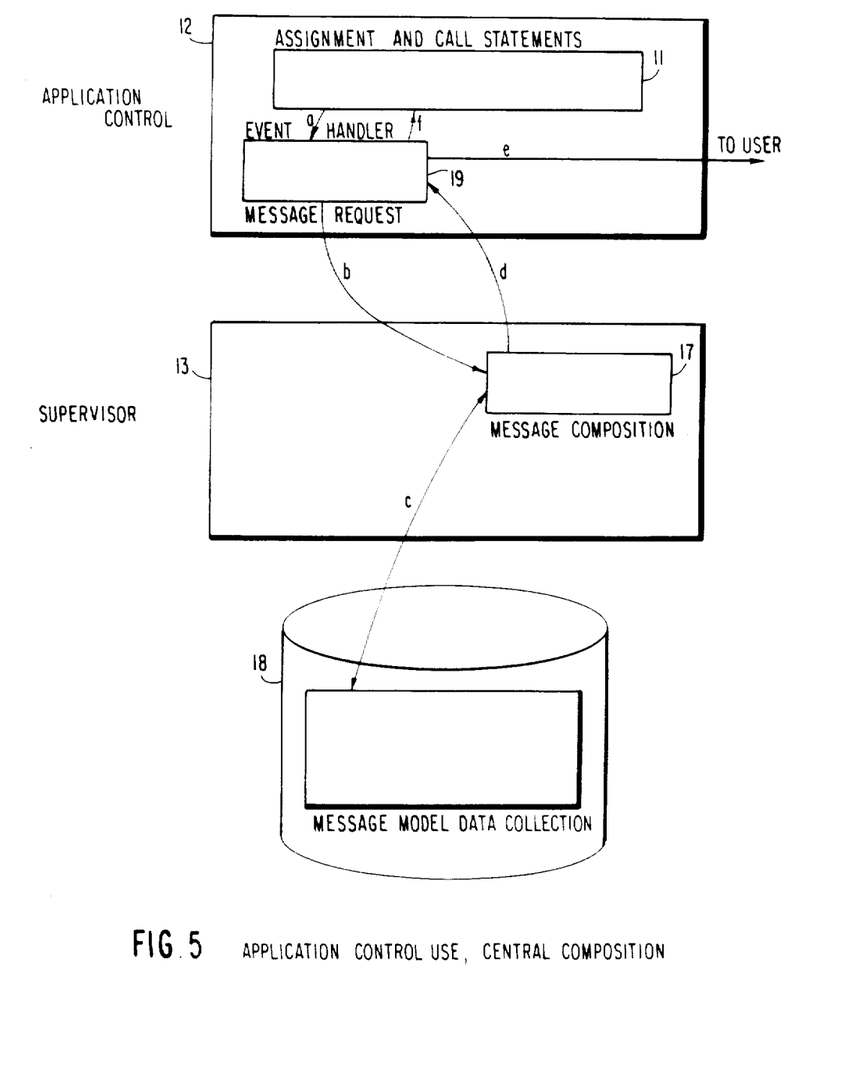
FIG. 5 is a block diagram illustrating the flow of message data with central composition of the message and use by the application control program.

In FIG. 5, the Application Control program 12 uses a control statement 11 to (a) assign values to substitutable variables,(b) store the message model identification in a variable, and (c) call Message Request 19 in Application Control 12. Message Request 19 is an event handler that decides how the message is to be passed to the user, and can base that decision on the message model identification. If the message model identification is one that means an indicator light should be turned on rather than passing textual information to the user, then that is done, and control returns to the next statement below control statements 11 as indicated by the arrow f. If, on the other hand, message text must be passed to the user, then a control statement in Message Request 19 of Application Control 12 passes control to Message Composition 17 in the Supervisor 13 as indicated by the arrow b. Message Composition 17 uses the Message Model identification and the national language index established when the user signed onto the computer, e.g. 006 for Spanish, to obtain the correct message model from the Message Model Data Collection 18 as indicated by the arrow c. Any substitutable variable names in the message model are replaced by tne current value of the variables, the resulting text is stored as the value of a variable, and control returns to Message Request 19 in Application Control 12 as indicated by arrow d. Message Request 19 sends the message text to the user as indicated by arrow e and returns to the control statement following control statements 11 as indicated by arrow f.

Figure 6:
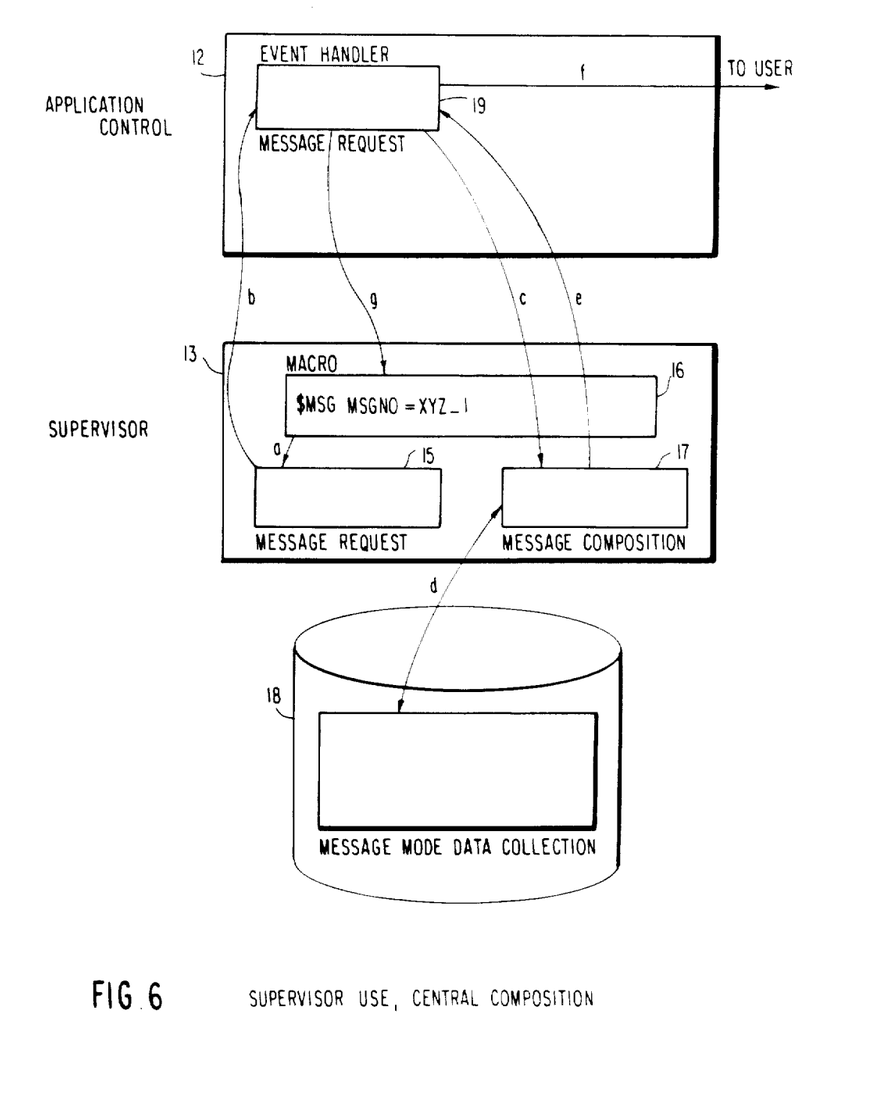
FIG. 6 is a block diagram illustrating the flow of message data with central composition of the message and use by the supervisor program.

In FIG. 6, the Supervisor program 13 uses a macro 16 to request message composition service. The macro can also assign values to variables that will be substituted into the message model during composition, but the example here will omit that detail. For example, the macro

MSG MSGNO=XYZ-1 requests information from message model XYZ-1 be given to tne user. The macro causes control to pass, as indicated by arrow a, to Message Request service 15 in Supervisor 13. Message Request 15 stores the message model identification (XYZ-1) in a variable, and causes an event to be stacked for Message Request 19 in Application Control 12 as indicated by arrow b. Message Request 19 is an event handler that decides how the message is to be passed to the user, and can base that decision on the message model identification. If the message model identification is one that means an indicator light should be turned on rather than passing textual information to the user, then that is done, and control passes back to the Supervisor 13 following the macro 16 as indicated by the arrow g. On the other hand, if message text must be passed to the user, then a control statement in Message Request 19 of Application Control 12 passes control to Message Composition 17 in the Supervisor 13 as indicated by the arrow c. Message Composition uses the Message Model identification (XYZ-1) and the national language index established when the user signed onto the computer, e.g. 006 for Spanish, to obtain the correct message model from the Message Model Data Collection 18 as indicated by arrow d. Any substitutable variable names in the message model are replaced by the current value of the variables, the resulting text is stored as the value of a variable, and control returns to Message Request 19 in Application Control 12 as indicated by the arrow e. Message Request 19 sends the message text to the user as indicated by the arrow f. Control then passes back to the Supervisor 13 following the macro 15 as indicated by arrow g.

In the disclosed implementations, the invention uses a service that provides a storage facility akin to associative memory accessible to all types of programs in the computer. Alternative implementations might use dynamic table creation and manipulation of other types of memory.

Besides providing a message to the the user in either a primary (preferred) or secondary (acceptable) language, the data processing system according to the invention is capable of accepting national language inputs from the user. Language dependent input to computers include the following:
1. Command Verbs,
2. Command Keywords,
3. Screen Input Fields, and
4. Acceptable synonyms or abbreviations of any of the above.

First, consider the simplest example which assumes no abbreviations are allowed. Assume a program XYZ is written in the United States and values it can receive for input include DELETE, RENAME, UPDATE, and CREATE. A message model would be defined with identifier XYZ-INPUT-1, and which contained the following pairs of text strings:
XYZ-DELETE DELETE
XYZ-RENAME RENAME
XYZ-UPDATE UPDATE
XYZ-CREATE CREATE
A utility program is given the message identifier XYZ-INPUT-1, and it would perform the following services:

1. Request message service to provide message XYZ-INPUT-1 in the current user's national language, assuming English for the United States.

2. Store the string DELETE as the value for variable name XYZ-DELETE, store the string RENAME as the value for variable name XYZ-RENAME, and so on.
Program XYZ can now compare the input received with the value contained by the variables XYZ-... known to the program and learn what was received.

Abbreviations can be handled with triplets of or n-tuples of values. As one example, assume abbreviations allow truncation from the right end of the word some minimum number of letters required. Then the values stored could be as follows:
XYZ-DELETE DELETE 3
XYZ-RENAME RENAME 2
XYZ-UPDATE UPDATE 3
XYZ-CREATE CREATE 2
where the number represents the minimum number of letters that will be accepted as an abbreviation. The utility program would store DELETE as the value of variable XYZ-DELETE, store 3 as the value of XYZ-DELETE-NO, and similarly for the other triples. The program now has enough information to look for partial abbreviations if a match is not found for the complete string DELETE. Other types of abbreviations could use the third value in the triple as a pattern to extract the abbreviation letters from the second value in the triple. For example, the preferred abbreviation of SHARED might be SHR, and XX.X.. would be used as the template to extract the abbreviation. The utility programs could contain special provision for non-European languages where truncation may be from the left or where a character requires two bytes of storage.

As a further extension of the invention, a mechanism is provided to facilitate the generation of messages, such as for example error messages, by existing application components such that national language support can be added to these components without making any modifications to the component. This mechanism also allows new languages to be added without modifying the component. Two assumptions are made: First, it is assumed that each message will be preceded by a message identifier which is unique to the message. This is likely to be a valid assumption since standards have been established by companies in the data processing field. An example of one such standard is IBM Interdivisional Standard I-S 3-7019 002 which describes the standards for the Message Formats including the Message ID. This standard states that each informational or error message should be preceded by a three to six character component identification code followed by a three or four character message number followed by a severity code or action code. Pages 529 to 542 of IBM COBOL product manual SC28-6483-1, as updated by TNL SN26-0947, July 13, 1979, is an example of error messages from a specific application.

Secondly, it is assumed that each message will be displayed using one of the standard system message services. For instance, in the IBM 370 operating systems these would be: Write-To-Operator (WTO), Write-To-Operator-with-Reply (WTOR), Terminal PUT (TPUT), WRite TERMinal (WRTERM), or LINEDIT. This is also likely to be a valid assumption since these are the only services which have been available to perform this function.

The invention modifies the above system services to access a keyed data base using a key consisting of the concatenation of the message identifier and national language code. The data obtained from the data base can then be displayed in place of the original data provided in the error message. If no data is found which matches the derived key, the original data is displayed without modification. By selectively making entries in the data base, specific components can be supported with messages in selected languages. Messages for components and languages not entered into the data base will be unaffected, and the messages will be displayed just as the component originally generated the message. In addition, there are often characters in a message which are not part of the message skeleton itself but are generated by the component. These characters, referred to as variable information, convey additional information about an error or condition. For example, the error message, "EDIMSG5133 INVALID CHARACTER IN FILE ID: .........", indicates the file ID which contains an illegal character. This variable information can be transferred to the translated message by reserving a single character which cannot appear in any translated message, such as for example "%", and then using that character to indicate a substitution from the original message. For instance, the above message could be entered as follows in the message data base: "EDIGMSG513E INVALID CHARACTER IN FILE ID: %42-8". This would indicate that eight characters, starting with the forty-second character in the original message should be substituted in place of the "%42-8" in the transposed message. The substitution, of course, can come from anywhere in the original message and can be placed anywhere in the transposed message.

The invention can, of course, be used to produce messages in languages other than English for many different applications, COBOL being but one example. Thus, using the invention it is possible to provide applications such as language translators, document formatters, high level languages such as FORTRAN and PASCAL, and the like with the ablility to produce messages in any desired language without making any modifications to the application components.

There are many advantages to the concurrent multilingual capability provided by the invention. For example, multi-national companies could have one system with user terminals in several countries. A single copy of any function useful to that business could be used in any country without need for every user to know the same language. Additionally, development and maintenance of the business functions would be simplified because only one copy òf the program is enough for all users.

I claim:

1. A method of providing a distributed, interactive data processing system with concurrent multi-lingual use by a plurality of users, said data processing system including a message composition service, said method comprising the steps of:
   establishing a message model data collection by storing message models, said message models being stored with a message identifier primary key that is common for all usage and a secondary key that is a national language index,
   establishing for each user who signs onto said system a national language index corresponding to said secondary key,
   requesting said message composition service to compose a message for use by an interactive program run on said system, said message being identified by said primary key for the specific message requested and said secondary key established for the user for which the message is intended,
   retrieving from said message model data collection message models using said primary and secondary keys in response to a request to compose a message,
   composing said message from said message models retrieved from said message model data collection, and
   storing the composed message so that it can be used by said interactive program to communicate the message to the user.

2. The method recited in claim 1 further comprising the steps of:
   assigning values to substitutable variables in said message at the time said message composition service is requested to compose said message, and
   replacing any substitutable variable in the message models retrieved from said message model data base with current values of the variables at the time said message is composed.

3. The method recited in claim 1 further comprising the step of:
   providing in said message model data collection message models of informational and error messages generated by said interactive program, said method substituting messages in the national language of a user for the informational and error messages generated by said interactive program.

4. The method according to claim 3 wherein the step of composing includes the step of:
   reproducing the informational or error message of the interactive program in the event that no data is found in said data collection corresponding to said primary and secondary keys.

5. The method recited in claim 1 wherein the message models stored in said message model data collection are additionally stored with a tertiary key that indicates a level of knowledge about said data processing system possessed by various users of said system and wherein the users who sign onto said system indicate their relative level of knowledge corresponding to said tertiary key, said step of retrieving being performed by using said tertiary key in addition to said primary and secondary keys.

6. The method recited in claim 1 wherein said interactive program is an application program running on a supervisor program, said message composition service being part of said supervisor program, said application program including a macro or subroutine which performs said step of requesting and said supervisor program including a message request service which calls said message composition service to perform said step of retrieving, said message request service performing said step of storing by storing the composed message as the value of a variable in said macro or subroutine, said method further comprising the steps of
   retreiving said composed message as said value of said variable in said macro or subroutine, and
   communicating said composed message to a user.

7. The method recited in claim 1 wherein said interactive program is an application control porgram running on a supervisor program, said message composition service being part of said supervisor program, said application control program including a control statement which performs the step of requesting, said step of storing is performed by storing the composed message as the value of a variable in said control statement, said method further comprising the steps of:
   retrieving said composed message as the value of said variable in said control statement, and
   communicating said composed message to a user.

8. The method recited in claim 1 wherein said interactive program is a supervisor program and said message composition service is part of said supervisor program, said supervisor program further including a macro which performs said step of requesting and a message request service which calls said message composition service to perform the step of retrieving, said message request service performing said step of storing by storing the composed message as a value of a variable in said macro, said method further comprising the steps of:

retrieving said composed message as said value of said variable in said macro, and communicating said composed message to a user.

9. A method of providing a distributed, interactive data processing system with concurrent multi-lingual use by a plurality of users, said data processing system including a message composition service, said method comprising the steps of:

establishing a message model data collection by storing message models, said message models being stored with a message identifier primary key that is common for all usage and a secondary key that is a national language index, establishing for each user who signs onto said system a national language index corresponding to said secondary key, requesting a message for use by an interactive program run on said system, said message being identified by said primary key for the specific message requested and said secondary key established for the user for which the message is intended, storing said message identifier corresponding to said primary key in a variable and causing an event to be stacked for execution, determining how the message is to be passed to a user based on said message identifier, and if a nontext message is to be passed to the user, passing the message directly to the user, otherwise, requesting said message composition service to compose a text message to be passed to the user, retrieving from said message model data collection message models using said primary and secondary keys in response to a request to compose a message, composing said text message from said message models retrieved from said message model data collection, and storing the composed text message as a value of a variable in said interactive program, and sending said text message stored as said value of said variable to a user.

10. The method recited in claim 9 wherein said interactive program is an application program running on a supervisor program under control of an application control program, said message composition service being part of said supervisor program, said application program including a macro or subroutine which performs said step of requesting and said supervisor program and said application control program each including message request services, said supervisor program message request service responding to a request from said macro or subroutine for passing control to said application control program message request service, said application control program message request service being and event handler and performing the steps of storing said message identifier and determining how the message is to be passed to the user, said application control program message request service performing the step of storing by storing the composed message as said value of said varihble in said macro or subroutine, said method further comprising the step of:

retrieving said composed text message as said value of said variable in said macro or subroutine prior to sending the text message to the user.

11. The method recited in claim 9 wherein said intractive program is an application control program running on a supervisor program, said message composition service beig part of said supervisor program, said application control program including a control statement which performs the step of requesting and said application control program further including a message request service which responds to a request from said control statement, said message request service being an event handler and performing the steps of storing said message identifier and determining how the message is to be passed to a user and, if a text message is to be passed to the user, said message request service performing the step of storing by storing the composed text message as a value of a variable in said control statement, said method further comprising the step of:

retrieving said composed text message as said value of said variable in said control statement prior to sending the text message to the user.

12. The method recited in claim 9 wherein said interactive program is a supervisor program on which there is running an application control program, said message composition service being part of said supervisor program and said supervisor program further including a macro which performs said step of requesting, said supervisor program and said application control program each including message request services, said supervisor program message request service responding to a request from said macro for passing control to said application control program message request service, said application control program message request service being an event handler and performing the steps of storing said message identifier and determining how the message is to be passed to a user and, if a text message is to be passed to the user, said application control program message request service performing the step of storing by storing the composed message as the value of a variable in said macro, said method further comprising the step of:

retrieving said composed text message as said value of said variable in said macro prior to sending the text message to the user.

* * * * *